United States Patent [19]

Kawakubo et al.

[11] Patent Number: 5,626,111
[45] Date of Patent: May 6, 1997

[54] STRUCTURE FOR BLOCKING OIL SUPPLY HOLE OF KICK IDLE GEAR BEARING PORTION

[75] Inventors: Hiroyuki Kawakubo; Satoru Narita, both of Saitama, Japan

[73] Assignee: Honda Giken Kogyo Kabushiki Kaisha, Japan

[21] Appl. No.: 476,321

[22] Filed: Jun. 7, 1995

[30] Foreign Application Priority Data

Dec. 26, 1994 [JP] Japan .................................. 6-336578

[51] Int. Cl.$^6$ .............................. F01M 11/00; F02N 3/04
[52] U.S. Cl. ........................ 123/179.24; 138/92; 384/380
[58] Field of Search ......................... 123/179.24, 185.5, 123/185.6; 138/92; 384/380, 381

[56] References Cited

U.S. PATENT DOCUMENTS 3,423,024  1/1969  Morawetz .................... 138/92

FOREIGN PATENT DOCUMENTS

6-22143  6/1994  Japan .

*Primary Examiner*—Andrew M. Dolinar

[57] ABSTRACT

A structure for blocking an oil supply hole of a kick idle gear bearing portion is provided in an internal combustion engine of a type wherein a kick starting mechanism is removably mounted for transmitting an input from a kick arm to a crank shaft by way of a kick idle gear rotatably supported by a counter shaft. When the kick starting mechanism is removed and a self stating mode is set, an oil supply hole of a bearing portion in the state that the kick idle gear of the counter shaft is removed is blocked by a blocking member having a slip preventive function. The blocking member includes an insertion portion inserted in the oil supply hole, and an abutment portion integrally formed with the insertion portion, which is abutted on the outer peripheral surface of the bearing portion.

12 Claims, 6 Drawing Sheets

STRUCTURE FOR BLOCKING OIL SUPPLY HOLE OF KICK IDLE GEAR BEARING PORTION

BACKGROUND OF THE INVENTION

1. Field of the Invention

The present invention relates to an internal combustion engine for mounting on a motorcycle and including a kick starting mechanism removably mounted relative to the engine for starting an engine by kicking. More particularly, the present invention is directed to a structure for blocking an oil supply hole of a kick idle bearing portion in the state where the kick starting mechanism is removed.

2. Description of Background Art

Figure 1:
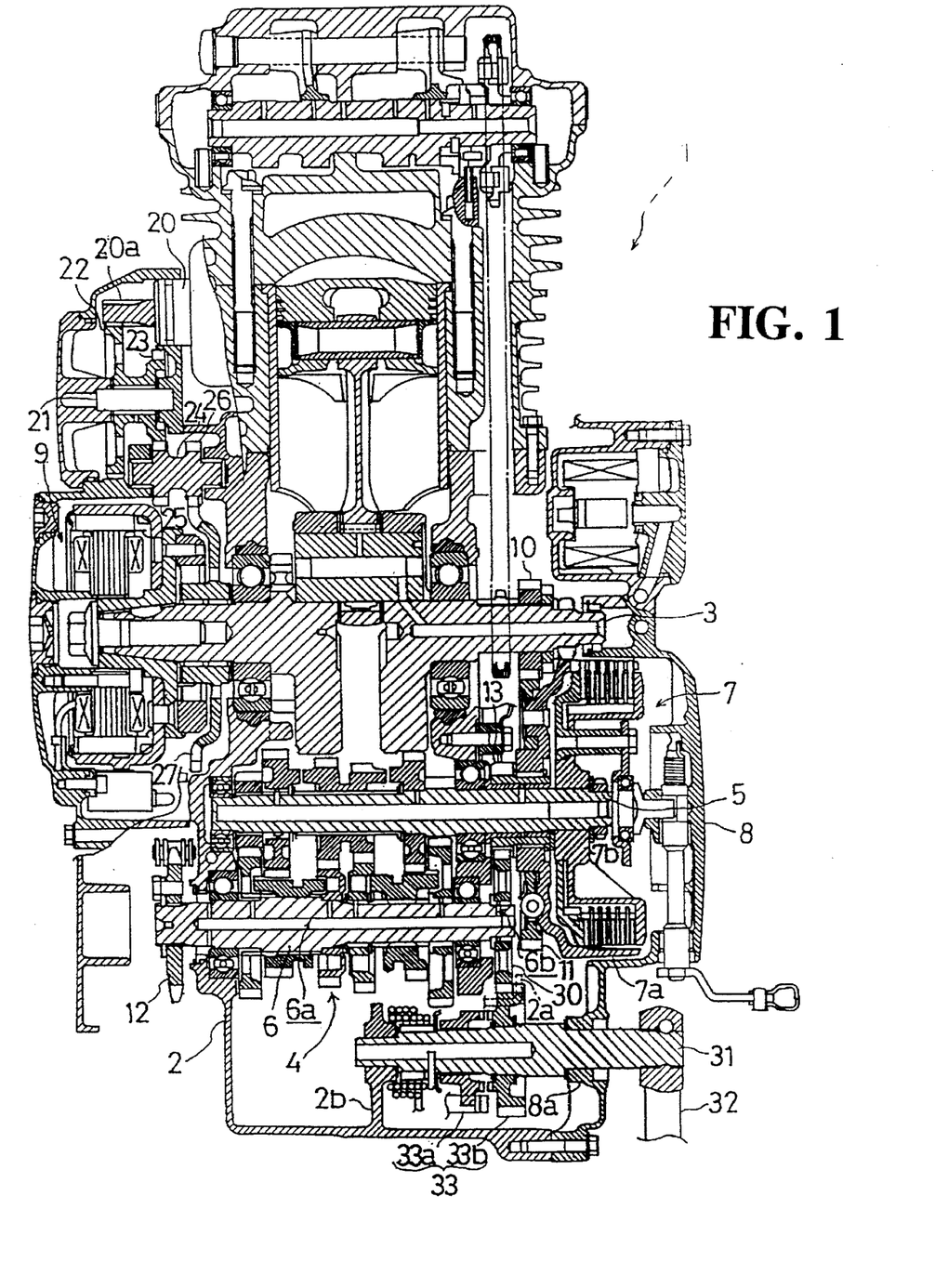
FIG. 1 is a sectional view showing an internal combustion engine mounted with a kick starting mechanism, to which the embodiment of the present invention is applied.

Various kinds of internal combustion engines of a type in which the kick starting mechanism is removably provided have been known, for example, Examined Japanese Utility Model Publication No. HEI 6-22143. One example is shown in FIG. 1.

The internal combustion engine 1 is of a one-cylinder/four-cycle type used for a motorcycle. A crank shaft 3 and a transmission 4 are contained in a crank case 2. The transmission 4 has a construction in which a gear group fitted to a main shaft 5 is meshed with a gear group fitted to a counter shaft 6. A clutch 7 is disposed at the end portion of the main shaft 5.

A crank gear 10 fitted to the crank shaft 3 at the end portion opposite from an AC generator 9 is meshed with a clutch gear 11 rotated integrally with a clutch outer 7a of a clutch 7, and a clutch center 7b is fitted to a main shaft 5.

The drive of the engine is transmitted from the crank shaft 3 to the main shaft 5 by way of the clutch 7. The drive force thus transmitted rotates the counter shaft 6 by way of the meshing of the gears of the transmission 4. The rotation of the counter-shaft 6 is transmitted to a rear wheel by way of a chain mounted around a sprocket 12 fitted to the end portion of the counter shaft 6.

The internal combustion engine 1 has a self starting mechanism. A self starting motor 20 is disposed over the crank shaft 3. A drive shaft 20a of the self starting motor 20 is meshed with one gear of integral gears 22, 23 rotatably supported by a supporting shaft 21. The other gear 23 is meshed with one gear 25 of gears 25, 26 formed integrally with a rotating shaft 24. The gear 26 is meshed with a large diameter gear 27 rotatably supported around the crank shaft 3 by way of a one-way clutch.

When the self starting motor 20 is driven, the drive torque is transmitted to the crank shaft 3 by way of the gears 22, 23, 25, 26, and 27, thus starting the engine.

The drive torque of the crank shaft 3 is not transmitted to the self starting motor 20 by the one-way clutch.

The internal combustion engine 1 can be provided with a kick starting mechanism, other than the above-described self starting mechanism. FIG. 1 shows the internal combustion engine including the kick starting mechanism.

The above-described clutch gear 11 is integrally fitted with an idle gear 13 rotatably supported by the main shaft 5, and the idle gear 13 is meshed with a kick idle gear 30 rotatably supported by the end portion of the counter shaft 6.

The kick idle gear 30 is prevented from being slipped-off by a plate 2a projecting within the crank case 2.

Under the counter shaft 6, a kick shaft 31 is rotatably supported by a bearing portion of an inner wall 2b provided in the crank case 2 and a bearing portion of a clutch cover 8.

2

The kick shaft 31 passes through a bearing portion 8a of the clutch cover 8 and projects from the exterior of the crank case 2. The base end of a kick arm 32 is fitted to the end portion of the kick shaft 31.

A dog clutch 33 is provided on the kick shaft 31. One dog clutch gear 33a, spline-fitted to the kick shaft 31, can be removably fitted to the opposed dog clutch gear 33b which is rotatably supported. The rotatably supported dog clutch gear 33b is meshed with the kick idle gear 30 rotatably supported by the counter shaft 6.

Accordingly, when the kick shaft 31 is rotated by operation of the kick arm 32, the dog clutch 33 is activated, and the kick starting torque is transmitted to the kick idle gear 30, idle gear 13, clutch gear 11, crank gear 10 and crank shaft 3 in this order. The torque can be thus transmitted to the crank shaft 3, not by way of the clutch 7, to start the engine.

An oil passage 6a is formed at a center shaft portion in the counter shaft 6, and which is radially branched to form a plurality of oil supply holes for supplying oil to specified bearing portions. An oil supply hole 6b is also formed in the bearing portion of the kick idle gear 30.

The above-described kick starting mechanism can be mounted when needed. In the state when the kick starting mechanism is not provided, the kick idle gear 30 is also removed. Thus, the oil supply hole 6a of the bearing portion is opened to the outside. The oil supply hole 6a must be blocked.

Figure 6:
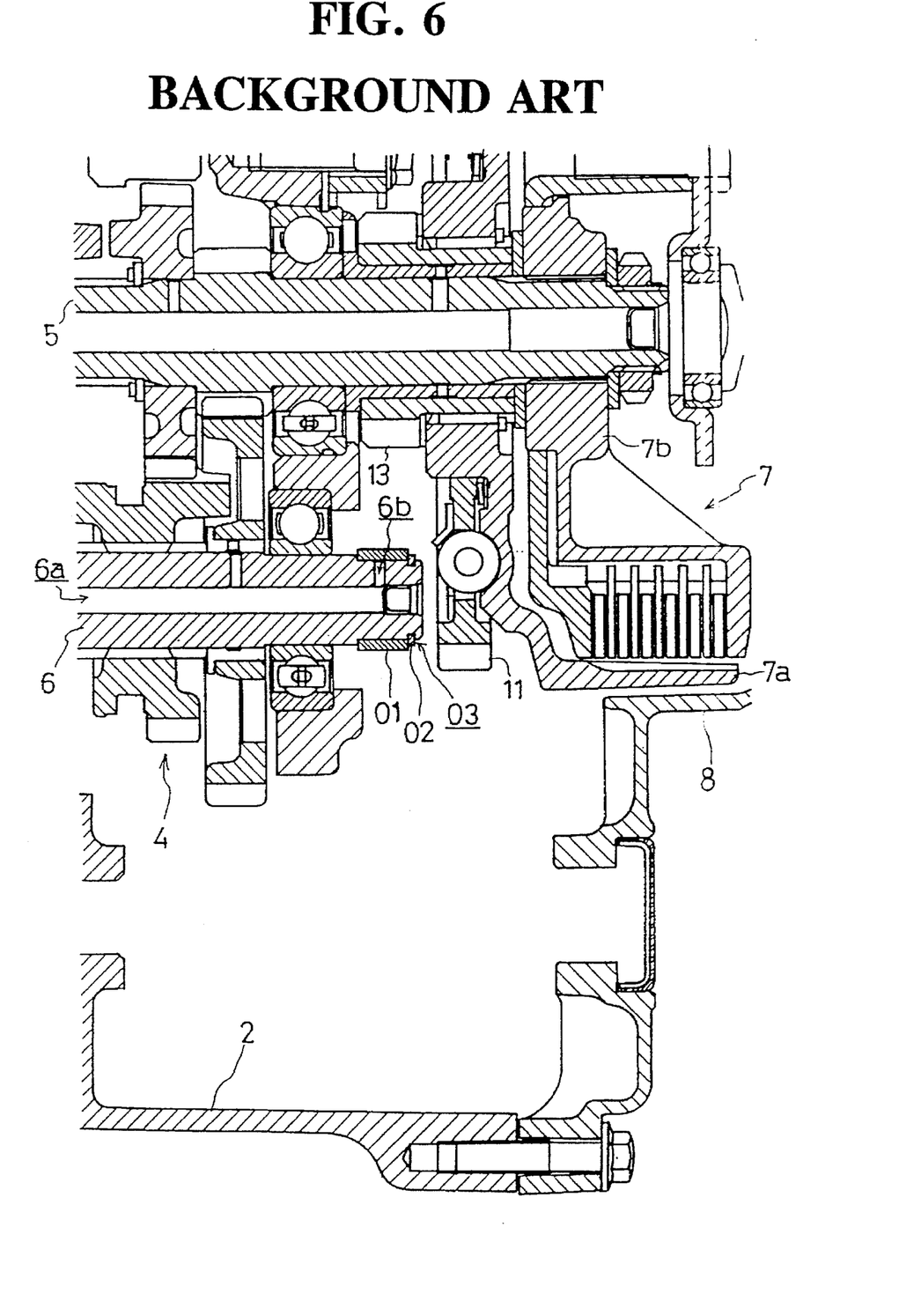
FIG. 6 is a sectional view showing an essential portion of the conventional internal combustion engine in the state wherein the kick starting mechanism is removed and a blocking member is mounted.

Conventionally, the oil supply hole 6a is blocked by a blocking structure shown in FIG. 6.

A cylindrical collar 01 having an inside diameter being substantially the same as the outside of the bearing portion of the counter shaft 6 is fitted to the bearing portion, to block an oil supply hole 6b, and a snap ring 02 is locked in a groove 03 formed at the end portion of the bearing portion for preventing the slip-off of the collar 01.

In the conventional way, to block the oil supply hole 6b, the two parts, namely the collar 01 and the snap ring 02, have been required. Further, it was also required to provide the groove 03 for locking the snap ring 02 to the counter shaft 6. This is disadvantageous in terms of manufacturing cost.

SUMMARY AND OBJECTS OF THE INVENTION

An object of the present invention is to provide an oil supply hole blocking structure capable of reducing the number of parts thereby lowering the manufacturing cost.

To achieve the above object, a structure is provided for blocking an oil supply hole of a kick idle gear bearing portion in an internal combustion engine of a type wherein a kick starting mechanism is removably mounted for transmitting an input from a kick arm to a crank shaft by way of a kick idle gear rotatably supported by a counter shaft. When the kick starting mechanism is removed, a self starting mode is set. An oil supply hole of a bearing portion in the state where the kick idle gear of the counter shaft is removed is blocked by a blocking member having a slip preventive function. The blocking member includes an insertion portion inserted in the oil supply hole, and an abutment portion integrally formed with the insertion portion, which is abutted on the outer peripheral surface of the bearing portion.

An oil supply hole of a bearing portion in the state where a kick idle gear of a counter shaft is removed is blocked by inserting the insertion portion of the blocking member in the oil supply hole, and allowing the abutment portion integrated with the insertion portion to be abutted on the outer peripheral surface of the bearing portion. At this time, the blocking member itself is engaged with the bearing portion by the combined effect of the insertion of the insertion portion in the oil supply hole and the abutment of the abutment portion on the outer peripheral surface of the bearing portion, thus achieving the slip-off preventive effect. Accordingly, the oil supply hole can be blocked by only one blocking member, thus reducing the number of parts and eliminating the necessity of the provision of a special locking groove in the counter shaft, resulting in a reduction in the manufacturing cost.

The above-described blocking member can be obtained by bending a bar material having a diameter being substantially the same as that of the oil supply hole. One end of the bar material is provided as the insertion portion while a part of the bent portion is provided as the abutment portion. With this arrangement, the bar member can be mounted on the bearing portion by inserting the insertion portion of the bar member in the oil supply hole and allowing the abutment portion to be abutted on the outer peripheral surface of the bearing portion. Thus, the oil supply hole is blocked by the insertion portion and the bar member is supported without slip-off by the insertion of the insertion portion and the abutment of the abutment portion.

The above-described blocking member can be formed of a cylinder member having an inside diameter being substantially the same as the outside diameter of the bearing portion of the counter shaft and being partially cut-out so as to form a C-shape in section, and a projection projecting from the inner peripheral surface of the cylinder member is taken as the insertion portion while the whole of the cylinder portion is taken as the abutment portion. With this arrangement, the cylinder portion can be mounted on the bearing portion by fitting the partially cut-out cylinder portion in the bearing portion and inserting the projection in the oil supply hole. Thus, the oil supply hole can be blocked by the insertion of the projection and the inner surface of the cylinder portion, and the cylinder member itself can be supported without slip-off by the insertion of the projection and the fitting of the cylinder portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 2:
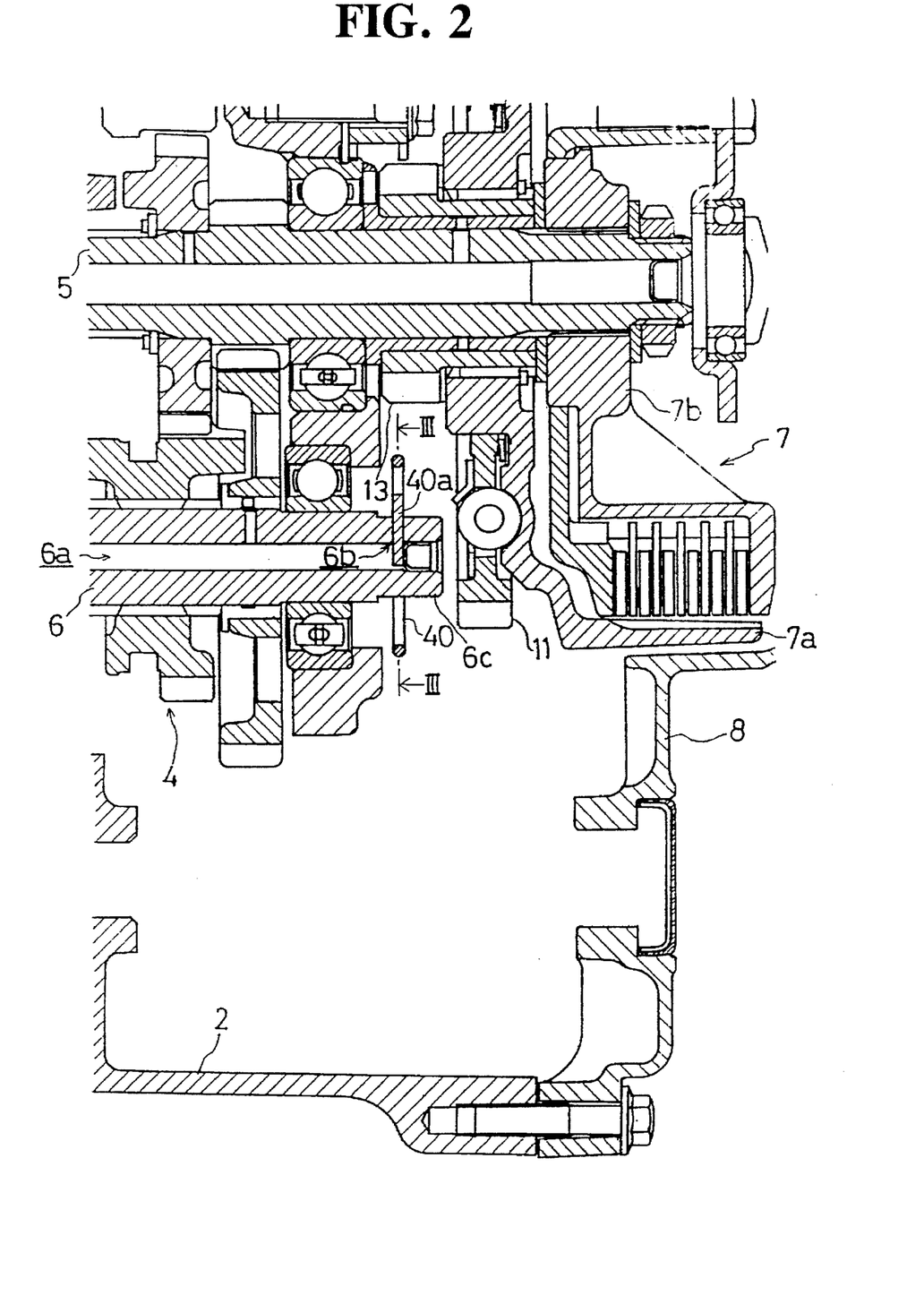
FIG. 2 is a sectional view showing an essential portion of the internal combustion engine in which the kick starting mechanism is removed and a pin as a blocking member is mounted.

Hereinafter, one embodiment of the present invention will be described with reference to FIGS. 2 and 3. As shown in FIG. 2, a kick starting structure is removed, and therefore, a kick arm 32, kick shaft 31, dog clutch 33 and a kick idle gear 30 are not illustrated.

A block member for blocking an oil supply hole 6b of a bearing portion 6c, to which the kick idle gear 30 of a counter shaft 6 has been fitted before removal of the kick starting mechanism, is a bar-like pin 40 made of steel.

Figure 3:
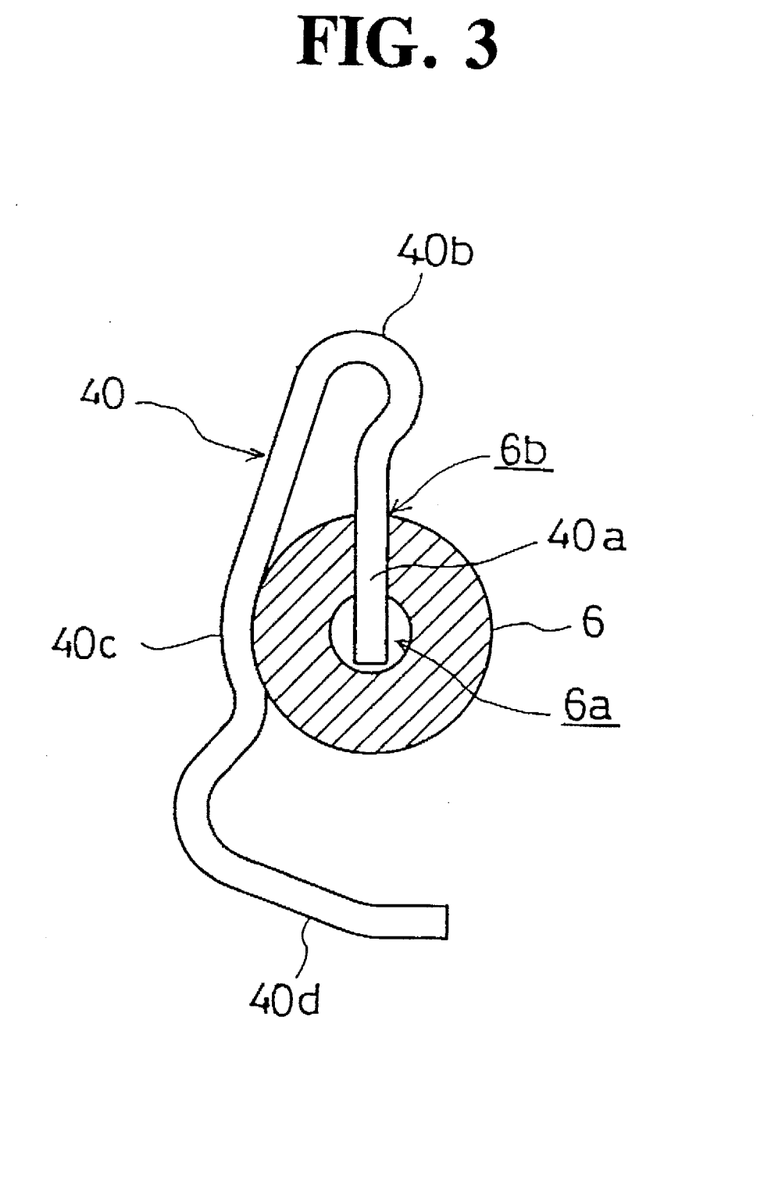
FIG. 3 is a sectional view taken along line III—III of FIG. 2.

The pin 40 is a bar member having a diameter being the same as the inside diameter of the oil supply hole 6b, and has a bent shape as shown in FIG. 3.

Namely, the pin 40 includes an insertion portion composed of a straight line portion 40a linearly extending from one end, which is inserted in the oil supply hole 6b. A bent portion 40b is bent in a hair pin curve shape from the straight line portion 40a. A curved portion 40c is curved along the outer peripheral surface of the bearing portion 6c which functions as an abutment portion to be abutted on the outer peripheral surface of the bearing portion 6c. An extension portion 40d extends from the curved portion 40c, which is bent while being separated from the bearing portion 6c and goes around the side opposed to the oil supply hole 6b.

Accordingly, when mounting the pin 40, an operator holds the extension portion 40d and inserts the leading end of the straight line portion 40a in the oil supply hole 6b of the bearing portion 6c.

As the insertion of the pin 40 proceeds, the end portion of the curved abutment portion 40c is contacted with the outer peripheral surface of the bearing portion 6c. The pin 40 is further inserted, and the bent portion 40b is elastically deformed in the open direction so that the curved portion 40c is smoothly fitted around the outer peripheral surface of the bearing portion 6c, thus obtaining the mounting state shown in FIGS. 2 and 3.

The oil supply hole 6b is blocked by the insertion of the straight line portion 40a of the pin 40, and the pin 40 is engaged with the side walls of the bearing portion 6c in such a manner as to hold the side walls therebetween by the insertion of the straight line portion 40a in the oil supply hole 6b and the abutment of the curved portion 40c on the outer peripheral surface of the bearing portion 6c, to be thus prevented from slipping-off without any locking member.

Accordingly, it is possible to reduce the number of parts, and to eliminate the necessity of the provision of any special locking groove in the counter shaft 6 resulting in a reduction in the manufacturing cost.

When the pin 40 is removed, the straight line portion 40a can be removed from the oil supply hole 6b by pushing the extension portion 40d.

Next, another embodiment will be described with reference to FIGS. 4 and 5. This embodiment is applied to the above-described internal combustion engine.

A partially cut-out cylinder member 50 is provided as a blocking member and is fitted to the bearing portion 6c, to which the kick idle gear 30 of the counter shaft 6 has been fitted before removal of the kick starting mechanism.

The cylinder member 50 has a cylinder portion 50b formed in a C-shape in section with a partially cut-out portion 50c. An inside diameter is provided which is substantially the same as the outside diameter of the bearing portion 6c. A projection 50a is provided at a position opposed to the cut-out portion 50c at the center of the inner peripheral surface of the cylinder portion 50b.

Figure 4:
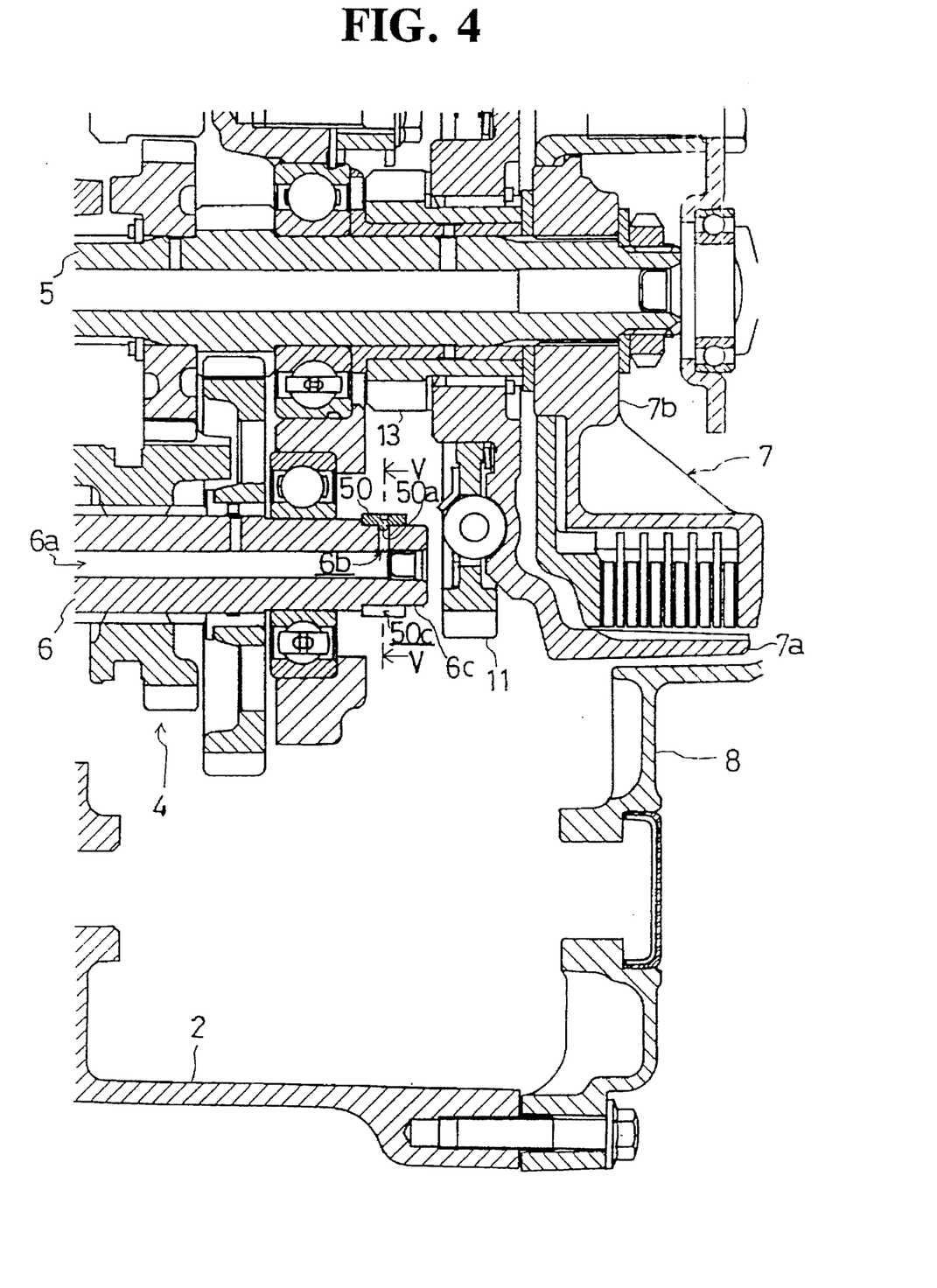
FIG. 4 is a sectional view showing an essential portion in the state wherein the kick starting mechanism is removed and a pin as a blocking member according to another embodiment is mounted.
Figure 5:
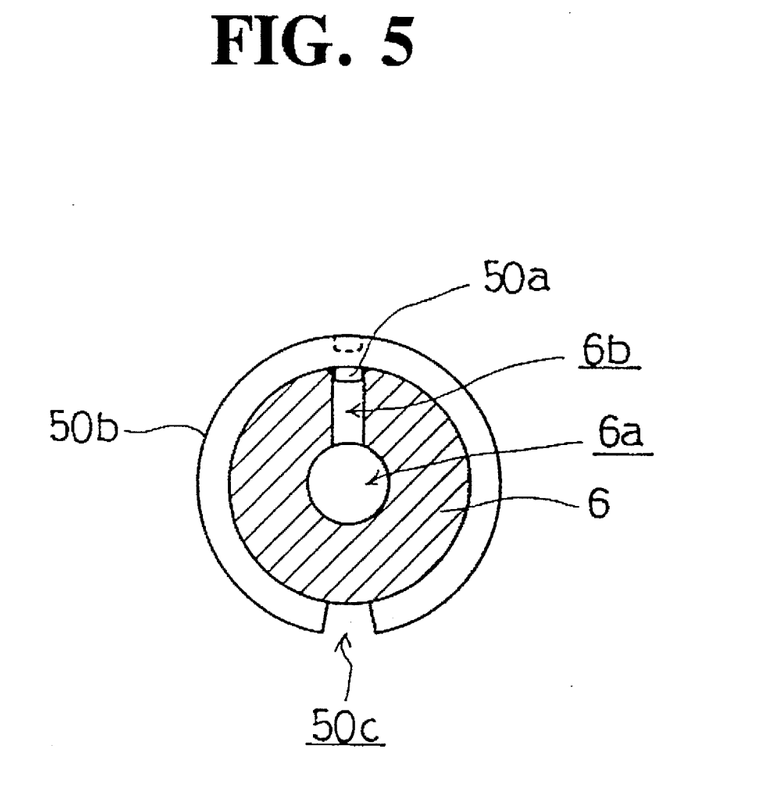
FIG. 5 is a sectional view taken along line V—V of FIG. 4.

The mounting state shown in FIGS. 4 and 5 can be obtained by fitting the cylinder member 50 to the bearing portion 6c and inserting the projection 50a on the inner peripheral surface in the oil supply hole 6b.

The oil supply hole 6b is blocked by the projection 50a and the inner peripheral surface of the cylinder portion 50b, and the blocking member itself can be prevented from being slipped-off by the fitting of the cylinder portion 50b to the bearing portion 6c and the insertion of the projection 50a in the oil supply hole 6b.

The oil supply hole can be thus blocked by the blocking member without any locking member and any locking groove in the counter shaft 6, thus reducing the cost.

According to the present invention, an oil supply hole of a bearing portion in the state where a kick idle gear of a counter shaft is removed is blocked by inserting an insertion portion of the blocking member in the oil supply hole, and allowing an abutment portion integrated with the insertion portion to be abutted on the outer peripheral surface of the bearing portion. At the same time, the blocking member itself can be engaged with the bearing portion by the insertion of the insertion portion in the oil supply hole and the abutment of the abutment portion on the outer peripheral surface of the bearing portion, to be prevented from being slipped-off. Accordingly, the oil supply hole can be blocked by only one piece of the blocking member. This reduces the number of parts and eliminates the necessity of the provision of any special locking groove in the counter shaft, thus reducing the manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for blocking an oil supply hole of a kick idle gear bearing portion in an internal combustion engine wherein a kick starting mechanism is removably mounted for transmitting an input from a kick arm to a crankshaft by way of a kick idle gear rotatably supported by a counter shaft comprising:

a case in which a kick starting mechanism is removably positioned;

a self starting mechanism;

a blocking member; and an oil supply hole of a bearing portion exposed when the kick idle gear of the counter shaft is removed, said blocking member forming a closure for said oil supply hole and having a slip preventive function;

said blocking member including an insertion portion inserted in the oil supply hole, and an abutment portion integrally formed with the insertion portion, which is abutted on the outer peripheral surface of the bearing portion;

wherein said blocking member is a bar having a diameter being substantially the same as that of said oil supply hole, and one end of said bar is provided as said insertion portion while part of a bent portion is provided as said abutment portion.

2. The structure for blocking an oil supply hole of a kick idle gear bearing portion according to claim 1, wherein said insertion portion of said bar projects from said oil supply hole and extends along an outer surface of said counter shaft for retaining said blocking member relative thereto.

3. The structure for blocking an oil supply hole of a kick idle gear bearing portion according to claim 2, wherein said blocking member includes an extension portion extending from the portion of said blocking member which engages said counter shaft and projecting beneath the insertion portion of said bar.

4. The structure for blocking an oil supply hole of a kick idle gear bearing portion according to claim 3, wherein said extension portion extends outwardly from an axis of said counter shaft prior to projecting beneath the insertion portion of said bar.

5. A device for blocking an oil supply hole of a kick idle gear bearing portion in an internal combustion engine comprising:

a blocking member including having a slip preventive function;

said blocking member having an insertion portion inserted in the oil supply hole and an abutment portion integrally formed with the insertion portion, said abutment portion being abutted on the outer peripheral surface of the kick idle gear bearing portion;

wherein said blocking member is a bar having a diameter being substantially the same as that of said oil supply hole, and one end of said bar is provided as said insertion portion while part of a bent portion is provided as said abutment portion.

6. The device for blocking an oil supply hole of a kick idle gear bearing portion according to claim 5, wherein said insertion portion of said bar projects from said oil supply hole and extends along an outer surface of said kick idle gear bearing portion for retaining said blocking member relative thereto.

7. The device for blocking an oil supply hole of a kick idle gear bearing portion according to claim 6, wherein said blocking member includes an extension portion extending from the portion of said blocking member which engages said kick idle gear bearing portion and projecting beneath the insertion portion of said bar.

8. The device for blocking an oil supply hole of a kick idle gear bearing portion according to claim 7, wherein said extension portion extends outwardly from an axis of said counter shaft prior to projecting beneath the insertion portion of said bar.

9. A blocking member for blocking an oil supply aperture formed in a bearing member, said blocking member including a bar comprising:

an insertion portion located at one end of said bar and having a cross-sectional configuration substantially the same as a cross-sectional configuration of said oil supply aperture; and an abutment portion affixed to said insertion portion for releasably mounting said blocking member relative to said bearing member.

10. The blocking member for blocking an oil supply aperture formed in a bearing member according to claim 9, wherein said insertion portion extends a distance and includes a bent portion for reversing a direction of extension of said insertion portion.

11. The blocking member for blocking an oil supply aperture formed in a bearing member according to claim 10, wherein said abutment portion includes a curved portion disposed adjacent to said bearing member for releasably securing said blocking member relative thereto.

12. The blocking member for blocking an oil supply aperture formed in a bearing member according to claim 11, and further including an extension portion initially extending outwardly from said abutment portion and subsequently projecting beneath the insertion portion.

* * * * *